Dec. 19, 1950 I. A. WEAVER Re. 23,309
FLUID ACTUATED LOAD LIFTING AND LOWERING MECHANISM
Original Filed Nov. 28, 1947 3 Sheets-Sheet 1
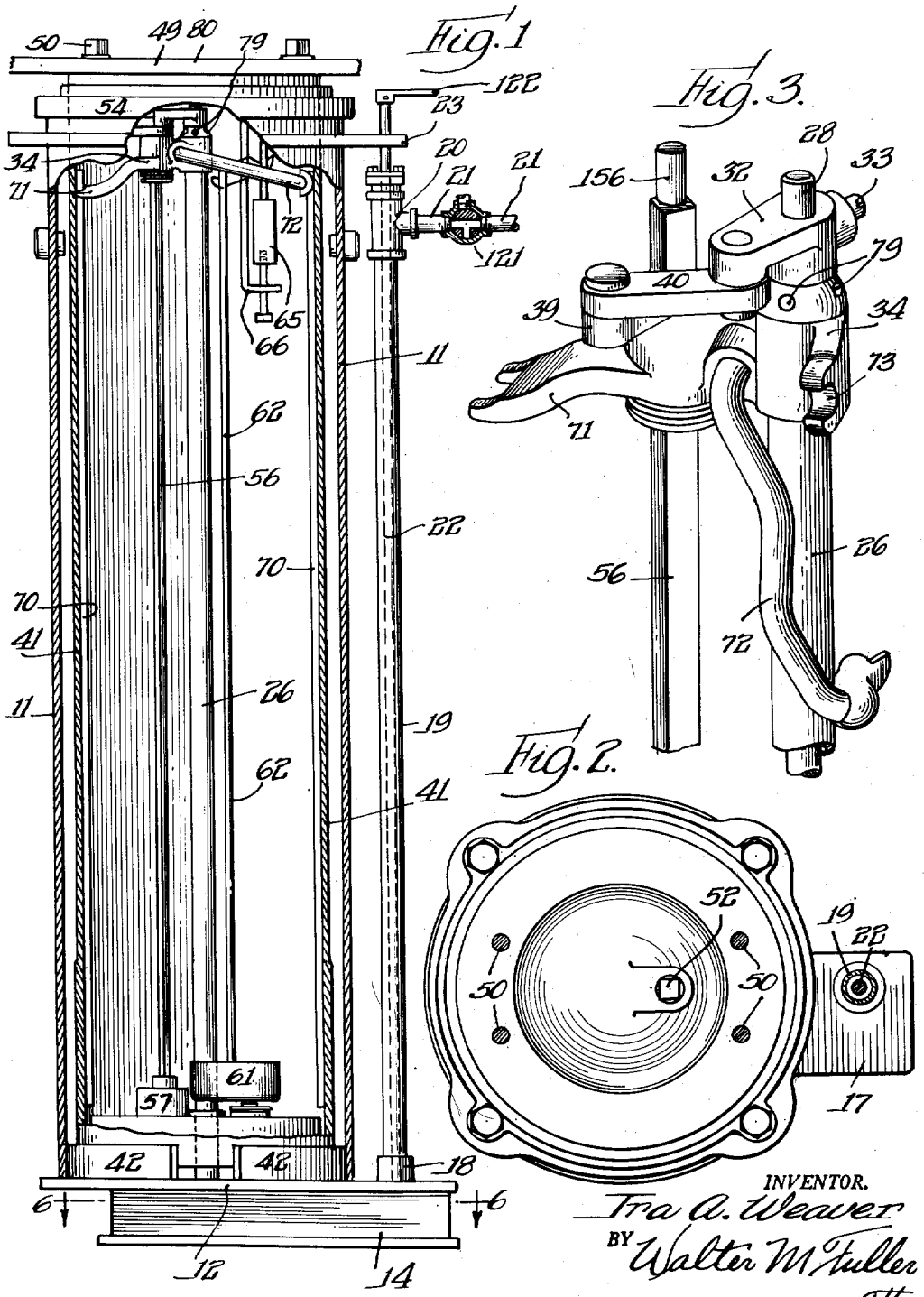
INVENTOR.
Ira A. Weaver
BY Walter M. Fuller
Atty.

Dec. 19, 1950 I. A. WEAVER Re. 23,309
FLUID ACTUATED LOAD LIFTING AND LOWERING MECHANISM
Original Filed Nov. 28, 1947 3 Sheets-Sheet 2
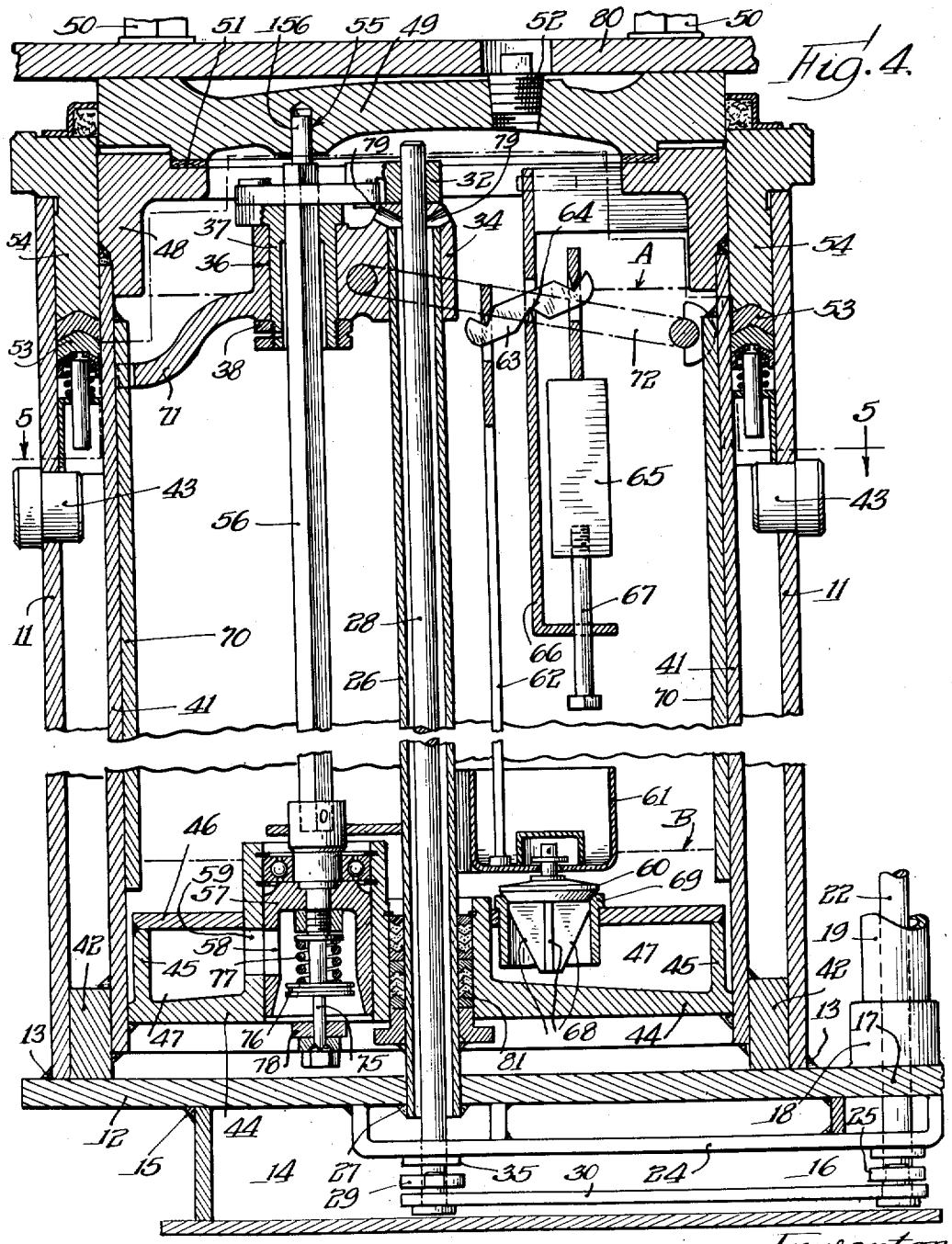
Inventor
Ira A. Weaver
By: Walter M. Fuller Atty Dec. 19, 1950 I. A. WEAVER Re. 23,309

FLUID ACTUATED LOAD LIFTING AND LOWERING MECHANISM

Original Filed Nov. 28, 1947 3 Sheets-Sheet 3

INVENTOR.
Ira A. Weaver
BY
Walter M. Fuller
Atty.

Reissued Dec. 19, 1950

Re. 23,309

UNITED STATES PATENT OFFICE 23,309

FLUID ACTUATED LOAD LIFTING AND LOWERING MECHANISM

Ira A. Weaver, Springfield, Ill., assignor to Weaver Engineering Co., a corporation of Illinois Original No. 2,471,989, dated May 31, 1949, Serial No. 788,381, November 28, 1947. Application for reissue April 4, 1950, Serial No. 153,881

8 Claims. (Cl. 121—46)

Matter enclosed in heavy brackets [ ] appears in the original patent but forms no part of this reissue specification; matter printed in italics indicates the additions made by reissue

The current invention relates to certain structural and functional improvements and innovatory betterments in hydraulic lifting and lowering appliances of the type having an upright cylinder enclosing or encasing a companion, hollow piston or plunger having its upper end closed and movable lengthwise within the cylinder to perform its operative service, such hollow post containing a body of oil or other suitable liquid reaching nearly to the top of the piston, an air-pipe extending through the bottom of the cylinder and up into the piston and terminating above the oil-level in the latter.

When air under suitable pressure is admitted through such pipe and on top of the liquid in the piston, the oil is forced down out of the latter into the cylinder thereby causing the piston to ascend and perform its load lifting or elevating action.

One of the objections to a lift of this general character is the inability to stop the movement or travel of the piston at a definite predetermined point when the controlling air-valve is closed, such uncertainty being due to the expansion of the air within the piston and to overcome this detrimental action, the lower end of the piston is closed and a packing gland surrounds the air-pipe, and a valve is also provided at the lower end of the piston so that the oil may pass freely from the piston to the cylinder when the valve is open but will stop any further movement of the piston when the valve is closed, regardless of whether there is any air pressure within the piston.

This invention also includes means to operate such oil control valve through the air inlet and contained wholly within the piston and air inlet leading to the same.

A further objection to an elevating appliance of the type previously described is that when the oil level is low in the piston the air will escape through the bottom of the piston before the full stroke of the piston is completed, the load then being supported by air pressure rather than by the liquid. The method of overcoming this factor is hereinafter disclosed.

In addition, a safety feature is provided to prevent the air that is under compression in the piston from reaching the cylinder if there is not a sufficient amount of liquid in the piston to complete the full stroke of the same, and to accomplish this desirable result a chamber cylinder is employed having a shut-off valve in its upper portion, such valve being attached to the bottom of a suitably shaped cut which is submerged in the liquid and when the liquid is low the weight of the oil in the cup forces the valve on its seat and prevents any further movement of the piston.

Such cup is suspended from a rod connected at one end to a pivoted link, and on the opposite end of such link is a rod supporting a counterweight which is above the cup when in its uppermost movement, the weight being sufficient to hold the valve but not heavy enough to support the cup that is full of liquid when the oil level falls below the cup which allows the valve to close, the pivoted link being attached to a support secured near the upper end of the piston.

In order that those acquainted with or skilled in this art may fully understand this invention and the advantages accruing from its employment and the manner in which the specified and other desirable objects and aims are secured, a present preferred embodiment of the invention has been illustrated in detail in the accompanying drawings in the several views of which like reference numerals have been employed to designate the same parts.

In these drawings:

Figure 1, for the most part, is a longitudinal, central, vertical section through the complete appliance;

Figure 2 is a partial plan of the appliance with some elements shown in horizontal section;

Figure 3 is a fragmentary, perspective view of a top portion of the apparatus;

Figure 4 is a vertical section on line 4—4 of Figure 5;

Figure 5:
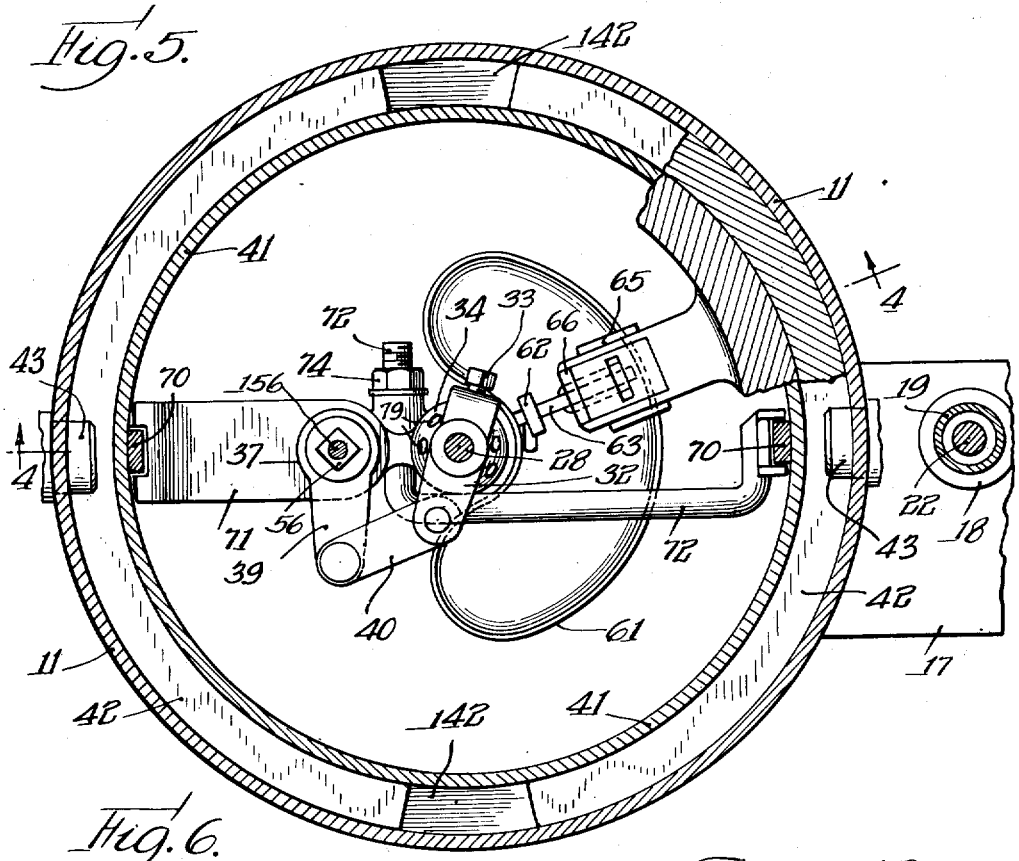
Figure 5 is a horizontal section on line 5—5 of Figure 4.

Referring to Figures 1 and 4 it will be noted that the appliance includes an external, upright, stationary, cylindrical cylinder 11 closed at its bottom by a plate 12 as by welding at 13, this weld being seal-tight and of a sufficient strength to withstand the necessary internal pressure.

Attached to such bottom plate 12 by welding, as at 15, is a hollow, air-tight, rectangular chamber 14, one end of which extends beyond the side of casing 11, as shown at 16, plate 12 being also shaped so that a portion of it extends beyond the side of casing 11, as shown at 17.

On top of such extended part of chamber 14 is welded a cylindrical, upward extended, hollow boss 18 (Figs. 1, 4 and 5), plate 12 being drilled through in line with such boss 18 thus affording access to the chamber 14.

This boss 18 is internally screw-threaded and into it is screwed the lower end of a vertical pipe 19 projecting upward alongside of and parallel to casing or cylinder 11, the upper end of such pipe (Fig. 1) terminating in a standard pipe fitting T20 into the side outlet of which a pipe 21 is screwed, which is supplied with an air-control valve 121 so that compressed air may be admitted into or exhausted from chamber 14 by proper manipulation of the valve 121, the latter being a conventional three-way valve or a two-way valve arrangement.

Figure 6:
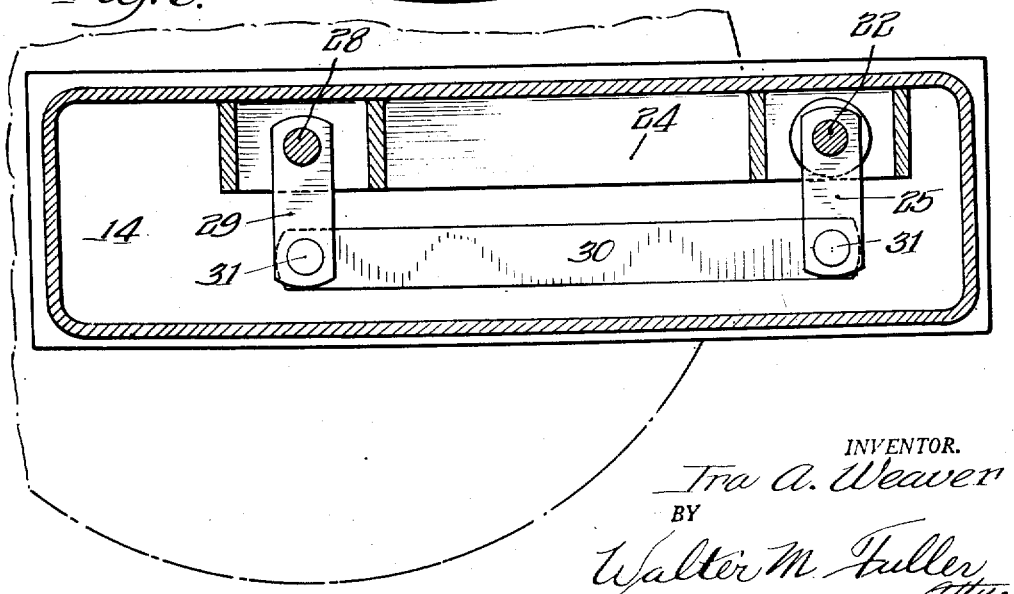
Figure 6 is a horizontal section on line 6—6 of Figure 1, but on a larger scale.

An upright rod 22 extends down through the T20 in pressure-sealed manner and also through the pipe 19, the upper end of such rod 22, equipped with handle 122, terminating above a suitable guide 23 welded on the side of casing or cylinder 11, the lower end of rod 22 projecting into chamber 14 with its end extending below an apertured guide or bearing 24 welded to the underside of bottom plate 12, such lower end portion of the rod having fixedly attached thereto a crank-arm 25 (Figs. 4 and 6).

On the radial center of cylinder 11 is an upright tube 26 projecting up through a hole in the base-plate 12 (Fig. 4) and it is securely welded to the lower side of such base-plate at 27.

Extending lengthwise through the center of such tube 26 is a rod 28 the lower terminal portion of which ends in the chamber 14 with the end extending below its bearing in guide 24 and fixedly attached to the lower end of such rod 28 is another crank-arm 29 (Figs. 4 and 6), the two ends of the companion crank-arms 25 and 29 being operatively connected together by means of an appropriate link 30 the ends of which are pivotally connected to the respective cranks by pivot-pins 31, 31 (Fig. 6) which can turn freely in the holes in the two ends of the link the length of which between such holes being the same as that of the center-to-center distance between the two upright rods 22 and 28 whereby when rod 22 is manually turned about its longitudinal axis by its handle 122 the rod 28 is likewise revolved a like amount in the same direction.

As is illustrated, rod 22 is proportionately much smaller in circular area than the internal area of its encasing pipe 19 so that air under pressure may pass freely through pipe 19, and rod 28 is smaller in cross-sectional area than its companion tube 26 for the same reason, the upper end of such rod 28 being rigidly attached to a crank-arm 32 by means of a set-screw 33 (Figs. 3 and 4).

Resting on top of the stationary tube 26 is a casting 34 (Figs. 3, 4 and 5), such portion of the casting bored out, as illustrated, to receive the tube 26 (Fig. 4) being apertured to a medium loose slide fit on the tube to facilitate assembly of the parts, casting 34 being prevented from coming off the end of tube 26 by the crank-arm 32 on the rod 28 which extends through tube 26.

This rod 28 cannot be pulled up out of tube 26 due to the presence of the crank-arm 29 on its lower end, since, as the rod 28 is lifted upward endwise through the tube 26, the crank-arm 29 secured at its lower end strikes the flange of the bushing 35 thus restaining it from being raised further. Then the upper crank 32, in the uniting of the parts, is slid down on rod 28 until it contacts the casting 34, whereupon the set-screw 33 is tightened thus retaining the elements as one assembly.

As is most clearly depicted in Figures 1, 3 and 4 just above the top end of tube 26, casting 34 has a plurality of openings 79 connected from the outside to the interior of tube 26.

In addition, casting 34 is bored vertically at 36 (Fig. 4) to receive the flanged bushing 37 which appropriately fits such bore so that it may rotate freely therein, this bushing 37 being retained in place by the nut 38 screwed onto its lower threaded end, the upper flange of the bushing being extended on one side radially to form a crank 39 (Fig. 3), a link 40, the same length as the centers' distance between the rod 28 and the bushing 37, connecting the outer ends of cranks 32 and 39, whereby, if the rod 28 be rotated a given amount such bushing 37 will be revolved a like amount in the same direction.

Reference has been made thus far to the encasing cylinder 11 and its associated elements all of which are stationary in a vertical or longitudinal direction with reference to the axis of such cylinder.

A hollow piston 41 (Figs. 1, 4 and 5) is mounted in and coaxial with cylinder 11 and is free to move up and down vertically therein.

Since the external diameter of piston 41 is substantially less than the interior diameter of cylinder 11 a pair of suitable arcuate guides 42, 42 (Figs. 4 and 5) are welded in endwise spaced relation around the lower end of piston 41, such associated members 42, 42 being slightly smaller in diameter than the inside of cylinder 11 so that they may slide freely up and down in the cylinder.

Two suitable stop-pins 43, 43 are welded diametrically opposite each other in the wall of cylinder 11 near the top of the same to limit the upward travel of piston 41 accomplished by the guide-members 42, 42 striking the stop-pins 43, 43 thus preventing further travel upwardly.

To enable the piston 41 to be properly introduced into the cylinder 11 such parts 42, 42 are spaced apart at two diametrically opposite points, at 142, 142, so that when inserting the piston 41 in the cylinder 11 the piston is rotated until the gaps 142, 142 between the elements 42, 42 are in line with the stop-pins 43, 43, the piston 41 then being entered into the cylinder 11 until the curved parts 42, 42 are below the stop-pins 43, 43, after which the piston is rotated 90° which is its normal operating relation as shown in Figure 5.

Referring to Figure 4, it will be noted that the lower end of piston 41 is closed by a welded-in lower head 44 having an upwardly extended skirt 45 to which is welded a cover-plate 46 forming a hollow enclosure 47.

At its upper end piston 41 has welded thereon a ring 48 (Fig. 4) having an inwardly extended flange portion to which ring is secured by a plurality of screws 50, 50 a head 49, such united parts 48 and 49 constituting a closure for the top of the piston, the construction being sealed airtight by a suitable gasket 51 between the elements 48 and 49, the latter having an aperture therethrough normally closed by a filler plug 52 permitting pouring of oil into the inside of the piston after which is accomplished, of course, the plug is screwed in tight.

As is clearly portrayed in Figure 4, between the cylinder 11 and the piston 41 a suitable conventional packing is provided at 53 with its customary retaining gland 54 whereby the piston may move vertically with relation to the encasing cylinder in pressure-tight manner.

Such upper head 49 on its underside is drilled partially through at 55 at a point in line with the center of the bushing 37 to receive the rounded end portion 156 of a square rod 56 which extends down through a square hole in the bushing 37 and may slide endwise through such hole when the bushing is rotated, it being noted that when the bushing 37 is turned the rod 56 is also revolved a like amount in the same direction.

A plug-valve 57 in the lower head 44 of the piston 41 has inner and outer ports 58 and 59 respectively so that as such valve is rotated the ports may be shifted out of register to close the valve or made to register with one another whereby oil may flow from chamber 47 in the lower head to the space below the piston-head 44 or vice versa.

As is illustrated, the lower end of the square rod 56 is attached in any approved manner to the stem of valve 57 in such a way that when the rod is turned the inner portion of the valve is thereby also turned, it being thus evident that such valve may be opened or closed by the operation of rod 22 by means of the suitable handle 122 attached to its upper end at the point where it extends upward through guide 23.

Referring now to valve 60 (Fig. 4) in wall 46 of chamber 47 in the lower portion of piston 41, it will be observed that an upright, open-top, crescent-shaped cup 61 (Figs. 1, 4 and 6) is mounted in any approved manner on such valve, a rod 62 being fixedly attached to the cup and extending upwardly therefrom with its top end pivotally associated with one end of a lever 63 fulcrumed at 64, a counterweight 65 being suspended from the opposite end of such lever 63, the fulcrum member 66 terminating at its lower end in a horizontally extending portion forming a guide for the stem 67 of the counterweight 65.

The weight value of such counterweight 65 is such that when the cup 61 is full of oil and completely surrounded by oil the combined weights of the cup 61 and the attached valve 60 and rod 62 are lighter than the counterweight and, therefore, valve 60, shown closed in the drawing, is normally open when surrounded by oil.

However, when cup 61 is surrounded by air only the weight value of the cup 61, which is full of oil, the attached valve 60 and rod 62 is greater than the weight value of the counterweight 65 and consequently the cup full of oil and associated parts will descend and the valve 60 will close.

Downwardly extending tapered ribs 68 on valve 60 serve as a guide for the valve thus insuring that it will always enter its seat 69 thereby closing properly.

Two diametrically opposite vertical ribs 70, 70 (Figs. 1, 4 and 5) are welded to the inside of the hollow piston 41, the casting 34 having a projecting portion 71 (Figs. 3, 4 and 5) notched at its end to slidingly engage one of such ribs 70, this casting 34 being also supplied with a swinging arm 72 notched at its outer end to slidably cooperate with the other opposite rib 70.

By rocking arm 72 up into place so that its notch engages rib 70 the end portion of the arm by which it is hinged to the casting 34 may be shoved endwise through its hole in the casting at the same time entering the substantially horizontal portion of arm 72 into the notch 73 (Fig. 3) provided on the side of the casting 34.

Arm 72 is securely, firmly held in place in operative position by means of nut 74 shown in Figure 5 screwed thereon, this arrangement being to facilitate assembly of the parts.

Thus it should be apparent that as the piston moves up and down the guides 70, 70 slide through their respective notches in the stationary extended portion 71 of casting 34 and in the outer end of the rigidly attached arm 72, this arrangement being provided to prevent the casting and its associated parts from turning about a vertical axis with respect to piston 41.

Referring again to valve 57 (Fig. 4), which is operated by rotation of the square shaft or rod 56, a downwardly projecting vertical stem 75 is mounted concentric with the valve, and slidable on such stem is a disc 76 held normally down by a superposed coiled-spring 77.

As is shown, the inside of the lower end of such plug-valve 57 is tapered, flaring downwardly so that its bore is larger at its extreme lower end than at a point further up, and thus, when the disc 76 is in its uppermost position, as shown in Figure 4, there is more restriction to the passage of oil through the valve than when the disc is in its extreme downward position bearing against a stop 78 on the lower end of the stem, and by proper choice of spring 77 the rate of flow of oil may be restricted to a predetermined amount.

Spring 77 always tends to maintain the disc down in the widest open position thereof, the oil flowing upward through valve 57 and through the ports 58 and 59, the velocity of the oil tending to raise the disc thereby restricting the opening and thus causing the oil to pass at a slower rate.

Operation.—The manner of functioning of this novel apparatus is as follows, it being understood that the top end of the piston 41 may be connected in any approved manner to any suitable means 80 for raising and lowering a load such, for instance, as a vehicle to be inspected or repaired although, of course, it will be readily understood that any suitable mechanism may be actuated by the movements of the traveling piston.

Such hollow piston or plunger 41 is filled with oil or other appropriate liquid to a suitable height, as indicated at A in Figure 4.

The cup 61 attached to the counterweighted valve 60 is now full of oil and is completely suspended in oil, the valve of the counterweight 65 being such that it more than balances the weight of the valve 60, the cup 61 and the attached rod 62, whereby valve 60 will be in wide open position thus admitting oil by gravity into the hollow chamber 47 which becomes filled therewith, but since valve 57 is closed none of such oil has been permitted to leave the piston and enter the cylinder.

When it is desired to elevate the load by the ascent of the piston the valve-controlled compressed-air pipe 21 being connected to the T 20 such valve is manually opened admitting air under appropriate pressure to the pipe 19, thence to the chamber 14, then through the tube 26 and the ports 79 of member 34 to the space above the oil in the piston.

Rod 22 by means of its handle 122 is then rotated in the proper direction thus revolving the rod 28 and crank-arms 25 and 29 and link 30, this rotation causing the square rod 56 to be turned through the action of arms 32 and 39 and the intermediate link 40.

This rotation opens valve 57 thereby permitting oil under pressure from the air-pressure in the hollow piston 41 to flow through the open valve 60 into the chamber 47, through valve 57 to the space in the cylinder under the piston or plunger 41 whereby the latter is caused to rise vertically, and when this takes place the square rod 56 ascends with the piston sliding endwise through the bushing 37.

Conventional packing 81 is employed on the lower head 44 of the piston 41, such packing and its associated retaining means sliding vertically on the outside of tube 26 in pressure sealing relation as the piston rises.

In this connection it is to be noted that the casting 34 and its cooperating and associated elements do not rise with the piston since they are secured to the tube 26 which is in turn fastened at its lower end to the cylinder-head 12.

Since, however, the square rod 56 slides through the bushing 37 in the casting 71 the operation of the above description for opening the valve 57 may take place at any point in the rise of the piston, and it should be observed that the series of controls may be operated to close the valve 57 at any position of the plunger.

As previously outlined, valve 60 is normally open as long as it and its companion cup are submerged in oil, but should the oil level in the piston 41 become too low for any reason, as for example, insufficient filling, leakage, etc., so that as the piston 41 rises the oil level descends to a point near the bottom of cup 61, as indicated at B (Fig. 4) the cup will descend due to the lack of buoyant effect of surrounding oil whereupon valve 60 will thereby automatically close and thus halt further ascent of the piston 41.

This action is desirable, since, if air were to be admitted to the space below the piston, it action becomes erratic, ascending or descending by jerks instead of smoothly and evenly as is the case when supported entirely on oil, the latter being practically noncompressible.

The lowering of the piston and the load therein is accomplished by exhausting the air from the space above the oil in the piston through manipulation of the air-controlled valve 121 leaving such space open to the atmosphere.

Obviously, during such operation the oil in the cylinder flows back into the piston ready for the next lifting action. That is to say, the operation of the rod 22 opens valve 57, as described above permitting the oil to flow from the space below the piston in a reverse direction through valve 57 into chamber 47 and thence through valve 60 into the hollow piston.

As previously presented, during such action disc 76 will tend to rise thereby restricting the return of flow of the oil upwardly through valve 57 should the piston descend too rapidly due to a heavy load upon it.

Disc 76 under these circumstances will compress the spring 77 more with a heavy load on the piston than with a light load due to the greater oil velocity with the heavier load.

Naturally, by proper choice of disc size inside the taper of valve-plug 57 and of the strength of the spring 77 the rate of descent of the piston 41 may be automatically controlled within safe limits for any amount of load.

From what precedes, it should be clear that if valve 57 is manually closed during any movement of the piston such piston travel is immediately terminated and locked regardless of whether the air pressure is on or off.

Stated somewhat otherwise, it is to be understood that such valve 57 may be instantly closed at any point in the stroke of the piston without exhausting the air pressure, thus making it possible to stop the piston movement at once and not allow expanding air to continue to raise the piston when the air supply is shut off.

Those acquainted with this art will readily understand that this invention is not necessarily limited or restricted to the precise or exact details of structure and operation set forth and that reasonable modifications may be availed of without departure from the heart and essence of the invention and without loss or sacrifice of any of its material benefits and advantages.

I claim:

1. In a load lifting and lowering appliance of known general type having an upstanding cylinder accommodating a hollow piston with a pressure-seal between them allowing the piston to reciprocate in the cylinder, said piston being adapted to contain a liquid, and means to apply such liquid under pressure from the piston to the cylinder beneath the piston to raise the latter and to return the liquid to the interior of the piston to lower the latter, the novel combination of means providing an air-chamber below the bottom wall of the cylinder, means providing a liquid-chamber in the lower portion of the piston, a first valve connecting the interior of the piston with the liquid-chamber, a second valve connecting the liquid-chamber with the cylinder beneath the piston, a first upstanding stationary air-tube outside of the cylinder and connected at its lower end to the air-chamber, a second upstanding stationary air-tube in the piston extending down through the bottom walls of the piston and cylinder with its lower end in communication with the air-chamber and with its upper end in communication with the piston above the highest liquid-level therein, controllable means near the top of the first air-tube to admit air under pressure into the first air-tube and cause it to discharge from the second air-tube into the piston or to discharge air from the first air-tube to the atmosphere, a first manually rockable rod occupying the first air-tube, a second rotary rod occupying the second air-tube, means operatively connecting together lower exposed portions of the two rods, and means connecting the upper portion of the second rod with the second valve to open and close the latter upon turning of the second rod by the manual turning of the first rod.

2. The novel combination presented in claim 1, including additionally in said combination a member mounted on the upper end of said second air-tube, longitudinal guide means on the inner face of said piston in sliding engagement with said member preventing turning of such member relative to said piston, and in which said means connecting the upper portion of said second rod with said second valve includes a bushing oscillatory in said member, a third upstanding rod slidable only through said bushing, and means connecting the lower end of said third rod with said second valve, whereby the piston and third rod may rise and descend while said member remains stationary.

3. The novel combination set forth in claim 1, including in said combination a supplemental valve in series relation with said second valve and spring-pressed toward open relation and acted upon by the liquid flowing upwardly through it against the action of such spring toward more closed relation.

4. The novel combination set forth in claim 1, including in addition in said combination liquid-level controlled means in said piston maintaining said first valve open so long as the liquid-level in the piston is above a predetermined height and closing said first valve when such level falls below such predetermined height thus precluding unintentional escape of air from the piston, said means including an open-top cup attached to said first valve, an upwardly extended rod fixed to said cup, and counterweight means acting on said rod of a value sufficient to open and close such valve as specified prefatorily in this claim; a pressure seal in the bottom portion of the reciprocatory piston surrounding and in sealing engagement with said stationary second air-tube the latter being coaxial with said piston; a member mounted on the upper end of said second air-tube, longitudinal guide-means on the inner face of said piston in sliding engagement with said member preventing turning of such member relative to said piston, and in which construction the means connecting the upper portion of the second rod with the second valve includes a bushing oscillatory in said member, a third upstanding rod slidable lengthwise only through such bushing but rockable with the bushing, and means connecting the lower end of said third rod with said second valve, whereby the piston and third rod may rise and descend while said member remains stationary; and a supplemental slidable disc-valve occupying a converging discharge-passage of said second valve and spring pressed toward the largest portion of said passage and also pressed by the liquid flowing through such passage toward its smallest portion.

5. The novel combination set forth in claim 1, including in addition in said combination liquid-level controlled means in said piston maintaining said first valve open so long as the liquid-level in the piston is above a predetermined height and closing said first valve when such level falls below such predetermined height thus precluding unintentional escape of air from the piston, said liquid-level controlling means for said first valve including an open-top cup in the piston attached to said first valve, an upwardly extended rod in the piston fixed to said cup, and counterweight means in the piston acting on said rod of a value sufficient to open and close such valve as specified prefatorily in this claim.

6. In a load lifting and lowering appliance of known general type having an upstanding cylinder accommodating a hollow piston with a pressure-seal between them allowing the piston to reciprocate in the cylinder, said piston being adapted to contain a liquid, and means to apply such liquid under pressure from the piston to the cylinder beneath the piston to raise the latter and to return the liquid to the interior of the piston to lower the latter, the novel combination of means providing an air-chamber below the bottom wall of the cylinder, means providing a liquid-chamber in the lower portion of the piston, a first valve connecting the interior of the piston with the liquid-chamber, a second valve connecting the liquid-chamber with the cylinder beneath the piston, a first upstanding stationary air-tube outside of the cylinder and connecting at its lower end with the air-chamber, a second upstanding stationary air-tube in the piston extending down through the bottom walls of the piston and cylinder with its lower end in communication with the air-chamber and with its upper end in communication with the piston above the highest liquid level therein, controllable means near the top of the first air-tube to admit air under pressure into the first air-tube and cause it to discharge from the second air-tube into the piston or to discharge air from the first air-tube to the atmosphere, manually operable means occupying said first air-tube, said second air-tube and said air-chamber to open and close said second valve.

*7. In a load lifting and lowering mechanism of the type having an upstanding cylinder accommodating a hollow piston with a pressure seal between them allowing the piston to reciprocate in the cylinder, said cylinder having a bottom wall, said hollow piston being adapted to contain a liquid and having a bottom wall, the combination of means providing an air chamber below the bottom wall of the cylinder, a first upstanding air tube outside the cylinder and connected at its lower end to said air chamber, a second upstanding air tube in said piston and extending down through the bottom walls of the piston and cylinder with its lower end in communication with said air chamber and its upper end in communication with the interior of the piston above the highest liquid level therein, controllable means near the top of said first air tube to admit air under pressure into the first air tube and cause it to discharge from the second air tube into said piston, or to discharge air from the interior of the piston to atmosphere, a control valve having an open position for admitting liquid under pressure from the interior of the piston to the interior of the cylinder beneath the piston to raise the piston and for returning the liquid from the interior of the cylinder beneath the piston to the interior of the piston to allow the piston to lower, said control valve having a closed position in which it positively traps the liquid in the cylinder against return to the interior of the piston, said control valve being of a character whereby in its closed position positively to prevent admission of further liquid from the interior of the piston to the interior of the cylinder beneath the piston under the action of the air above the level of the liquid in the piston, and manually operable means occupying said first air tube, said air chamber and said second air tube and connected to said control valve for operating said valve to its open and closed position.*

*8. In a load lifting and lowering mechanism of the type having an upstanding cylinder accommodating a hollow piston with a pressure seal between them allowing the piston to reciprocate in the cylinder, said cylinder having a bottom wall, said hollow piston being adapted to contain a liquid and having a bottom wall, the combination of means providing an air chamber below the bottom wall of the cylinder, a first upstanding air tube outside the cylinder and connected at its lower end to said air chamber, a second upstanding air tube in said piston and extending down through the bottom walls of the piston and cylinder with its lower end in communication with said air chamber and its upper end in communication with the interior of the piston above the highest liquid level therein, controllable means near the top of said first air tube to admit air under pressure into the first air tube and cause it to discharge from the second air tube into said piston, or to discharge air from the interior of the piston to atmosphere, a control valve having an open position for admitting liquid under pressure from the interior of the piston to the interior of the cylinder beneath the piston to raise the piston and for returning the liquid from the interior of the cylinder beneath the piston to the interior of the piston to allow the piston to lower, said control valve having a closed position in which it positively traps the liquid in the cylinder against return to the interior of the piston, said control valve being of a character whereby in its closed position positively to prevent admission of further liquid from the interior of the*

*piston to the interior of the cylinder beneath the piston under the action of the air above the level of the liquid in the piston, a first manually rockable rod occupying the first air tube, a second rockable rod occupying the second air tube, means operatively connecting the lower portions of said rods, and means operatively connecting the upper portion of said second rod with said control valve to open and close said control valve by turning of said second rod by manual turning of said first rod.*

IRA A. WEAVER.

REFERENCES CITED

The following references are of record in the file of this patent or the original patent:

UNITED STATES PATENTS

| Number | Name | Date |
|---|---|---|
| 649,375 | Wall | May 8, 1900 |
| 1,098,157 | Koken | May 26, 1914 |
| 1,764,859 | Stukenborg | June 17, 1930 |
| 1,846,436 | Perry et al. | Feb. 23, 1932 |
| 1,864,325 | Steedman | June 21, 1932 |
| 2,336,817 | Thompson | Dec. 14, 1943 |
| 2,402,265 | Thompson | June 18, 1946 |